(12) United States Patent
Barras

(10) Patent No.: US 7,523,349 B2
(45) Date of Patent: Apr. 21, 2009

(54) DATA VISUALIZATION FOR DIAGNOSING COMPUTING SYSTEMS

(75) Inventor: Doyle Barras, Murphy, TX (US)

(73) Assignee: Accenture Global Services GmbH, Schaffhausen (CH)

( * ) Notice: Subject to any disclaimer, the term of this patent is extended or adjusted under 35 U.S.C. 154(b) by 424 days.

(21) Appl. No.: 11/509,693

(22) Filed: Aug. 25, 2006

(65) Prior Publication Data

US 2008/0126858 A1 May 29, 2008

(51) Int. Cl.
*G06F 11/00* (2006.01)
(52) U.S. Cl. ...................................... 714/25
(58) Field of Classification Search ............ 714/25, 714/26, 31, 32, 37, 39, 57
See application file for complete search history.

(56) References Cited

U.S. PATENT DOCUMENTS

| | | | |
|---|---|---|---|
| 6,526,405 B1 * | 2/2003 | Mannila et al. | 707/6 |
| 7,418,733 B2 * | 8/2008 | Connary et al. | 726/25 |
| 7,424,647 B2 * | 9/2008 | Widmer et al. | 714/47 |
| 2002/0171646 A1 * | 11/2002 | Kandogan | 345/440 |
| 2004/0044912 A1 * | 3/2004 | Connary et al. | 713/201 |
| 2004/0168100 A1 * | 8/2004 | Thottan et al. | 714/4 |
| 2005/0246590 A1 | 11/2005 | Lancaster | |
| 2008/0126858 A1 * | 5/2008 | Barras | 714/25 |

OTHER PUBLICATIONS

Y. Chien, *Interactive Pattern Recognition, Electrical Engineeering and Electronics*, 1978, pp. 26-32, XP002412869.
R. De Veaux, *Statistical Approaches to Fault Analysis in Multivariate Process Control, Proceedings of the 1994 American Control Conference* (cat. No. 94ch3390-2) IEEE New York, NY, vol. 2, 1994, pp. 1274-1278, XP002412863.
European Search Report dated Jan. 23, 2007 for European Patent Application No. EP 06 01 7821.

* cited by examiner

*Primary Examiner*—Nadeem Iqbal
(74) *Attorney, Agent, or Firm*—Finnegan, Henderson, Farabow, Garrett & Dunner, LLP

(57) ABSTRACT

Disclosed herein is a data visualization methodology to assist network administrators and service engineers for complex computing systems in diagnosing and addressing faults, errors and other conditions within the computing system, and related computerized processes and network architectures and systems supporting the methodology. The methodology produces a visual representation of the relative severity and similarity of a various fault conditions occurring within a plurality of devices within the complex computing system. The visual representation visually depicts the various computing devices and/or resources within a three-dimensional grid located according to a first axis representing the severity of fault conditions being experienced by the devices/resources and second and third axes representing the similarity/disparity of the types of fault conditions being experienced by the devices/resources.

29 Claims, 8 Drawing Sheets

DATA VISUALIZATION FOR DIAGNOSING COMPUTING SYSTEMS

BACKGROUND OF THE INVENTION

1. Field of the Invention

The present invention relates, in general, to data analysis and representation methods and related computing operations for remotely diagnosing faults, errors, and conditions within a computing system containing various devices and network resources. More particularly, the present invention relates to a data processing and visualization methodology that assists administrators of such computing systems in diagnosing and addressing faults, errors and other conditions within the computing system.

2. Relevant Background

Modern computing utilizes system software, middleware, and networking technologies to combine independent computers and subsystems into a logically unified system. Contemporary complex computing systems are composed of computing devices, resources, and subsystems that are interconnected by standard networking technology. While comprised of many individual computing resources, a networked computing system may be utilized as a single computing system. Computing resources within a system each can be configured, managed and used as part of the larger network, as independent systems, or as a sub-network. Typically, individual subsystems and resources of the network system, and commercial scale systems in particular, are not fixed as the overall configuration of the system may change over time. Computing system resources can be added or removed from the computing system, moved to different physical locations within the system, or assigned to different groupings or farms at any time. Such changes can be regularly scheduled events, the results of long-term planning, or virtually random occurrences. Examples of devices in a network system may include, but are not limited to, load balancers, firewalls, servers, network attached storage, and Ethernet ports, and other resources of such a system include, but are not limited to, disks, VLANs, subnets, and IP Addresses.

Computing systems and networking have made possible on-demand computing practices whereby one group of computer users of a network working with bandwidth-heavy applications may be allocated bandwidth while bandwidth is likewise diverted away from other users of the network who do not need the bandwidth at that moment. Third party utility computing providers outsource computing resources in on-demand fashion (such as external server farms) to provide the extra boost of resources on-demand to clients for a pre-set fee amount. Generally, the operator of such a utility computing facility must track certain events (e.g., usage, etc.) to determine fees. These types of events are primarily intended for use by the computing system for billing their end users at the usage-based rate. In particular, this is how the provider of a utility computing server farm obtains income for the use of its hardware. Advantages associated with on-demand computing systems include increased utilization of computing resources, cost-sharing (splitting resources in an on-demand manner across multiple users), and improved management of system subsystems and resources.

Additionally, such complex contemporary computing systems also must monitor events that represent failures in the computing system for users. For example, most complex computing systems are redundant or "self-healing" such that when a device fails it is replaced automatically by another device to meet the requirements for the end user. Therefore, computing bandwidth is almost always available. While the end user may not experience any negative impact upon computing effectiveness, it is nevertheless necessary for service engineers of the computing system to examine a device that has exhibited failure symptoms. In particular, a service engineer may need to diagnose and identify the root cause of the failure in the device (so as to prevent future problems), to fix the device remotely and to return the device back to the computing system's resource pool.

Management of such complex computing systems is not an easy task. The devices and resources of a system can be geographically distributed within a single large building, or alternatively distributed among several facilities spread nationwide or globally. Typically, service engineers in an operations center spend a large portion of their time fixing problems associated with the events as opposed to considering and diagnosing the systematic issues that may cause the problem. Thus, the act of accumulating failure data with which to diagnose and address fault problems in and of itself is not a simple task.

Current network and systems management tools typically represent event data, including failure or error events, chargeable events, and other monitored events, to network service engineers in table form or encode those events by the color of an icon on a map, which map in turn various devices and resources in the network and the physical connectivity between devices and resources. The network service engineers then use the information provided by these management tools to identify and/or diagnose problems within their network and to direct the efforts of on-site service personnel in repairing suspected problems creating the events. Some of theses management tools have correlation engines that apply logic trees to assist the network service engineers in diagnosing root causes of the events, but such engines function in a deterministic manner whereby all underlying relationships between the devices must be known. The correlation engines provide service engineers with an automatically generated table of or list of one or more events with associated potential diagnoses of what root causes are for particular events.

Network services engineers can be in charge of monitoring and repairing multiple systems, making network management tools with correlation engines attractive. Unfortunately, correlation engines, while intriguing in theory, often fall short in reality because the layout and configuration of the various network resources, elements and subsystems forming a complex network system typically are constantly evolving and changing. In addition to detailed event data, such correlation engines must be provided with detailed configuration data describing accurately the physical and logical configuration, layout, and dependencies of the network system and its devices at the time of the event in order to operate properly. To keep the correlation engine in working order, engineers must monitor changes within elements of a network not only to make certain that the remedial actions won't cause problems with the operation of the network, but also to ensure that a failure to provide updated configuration information to the system management tool will not "break" the correlation engine. Unfortunately, it is difficult to maintain the input data because may engineers can make various changes to the network without knowledge of or permission of those engineers maintaining the input and configuration data. In such cases, correlation algorithms that are supposed to simplify the jobs of network service engineers can actually consume comparatively more of the service engineers' time.

Failure management also is often complicated by the fact that not all of the information and data concerning a failure may be saved. Computing devices that have agents running on them, such as servers, can readily generate and export failure report data for review by a management system or service. Many network devices, such as firewalls and load balancers, for example, may not have agents and thus other mechanisms are necessary for obtaining failure information. Additionally, such failure information, even when it is supposed to be tracked, may be lost in conjunction with a failure.

Event displays currently provided by most contemporary network management tools typically utilize a table format that can be sorted by different fields. In essence, the table comprises an extensive list of all events within the network, and includes information such as an event ID, time, type, severity, associated devices or subsystems, and the like. The shear number of events represented in these tables makes them unsuitable for aiding network service engineers in determining root causes for events or otherwise identifying common underlying factors or problems. In essence, the tables by themselves provide too much information to be useful by an unaided human in identifying and diagnosing systematic problems within the network.

Conversely, some network management tools utilize event displays where graphical topology maps are used to encode event severity, the nested nature commonly employed in such maps hide underlying causes of the events making it unclear as to the root cause. Graphical maps that represent services greatly reduce this issue but there again intimate knowledge of the underlying relationships of devices and network elements to services is needed for the approach to be effective.

In this regard, conventional mechanisms for tracking, reporting, identifying, diagnosing and remedying faults in a complex computing system suffer from a variety of problems or deficiencies that make it difficult to diagnose problems when they occur within the computing system. Current network and systems management tools merely relay event information in table format or encode event information within an object in a topology map providing little to no insight regarding possible device and resource problems causing the events. Correlation algorithms in theory may be used to help predict likely root causes which are then also displayed to a network service engineer, however, many hours can be consumed by a service engineer merely trying to understanding or keep track of the configuration of the system alone just to maintain the correlation engine in working order. Furthermore, in any event, once problems are detected it is oftentimes necessary for one or more service persons to go "on-site" to the location of the malfunctioning computing subsystem or resource in order to further diagnose and/or remedy the problem. Diagnosing fault events and other like problems therefore is often time consuming and expensive, and can result in extended system downtime.

Thus, there remains a need for improved computing methods for remotely reporting and diagnosing faults, errors, and other event conditions within a complex computing system.

SUMMARY OF THE INVENTION

It is an object of the present invention to provide systems and related computer implemented methods that summarize event data from a complex computer network into meaningful data points that a network service engineer can quickly review to identify patterns for understanding systematic issues affecting the network what's going on.

It is another object of the present invention to provide systems and related computer implemented methods that assist network service engineers for a complex computer network in identifying root causes for error events or other problems within the network without requiring data detailing the exact relationships between and interdependencies of the various network elements associated with the problems.

Further, it is an object of the present invention to provide systems and related computer implemented methods that displays event data from a complex computer network in the form of interactive views of the data.

To achieve these and other objects, the present invention provides a system, electronic tools, and various related methods that allow network administrators and service engineers for complex computing systems to visualize and diagnose the cause of faults and other like events in such a computing system. A fault is an imperfect condition that may or may not cause a visible error condition, or unexpected behavior (i.e., not all faults cause error conditions). The system and method can utilize a service interface, such as may be used by a service engineer, to the computing system environment. The service interface provides a network service engineer with the ability to communicate with and examine entities within those computing systems, to receive and monitor event data from those entities, and be provided with a visual representation regarding the relative status of various subsystems and/or devices within the computing system.

Embodiments of the present invention provide a graphical technique for representing large volumes of network system events and illustrating the relative statuses of various devices and resources within the network according to the relationship between individual events for those devices and resources using visual correlation techniques. As such, embodiments of the present invention allow device and resource status relationships to be analyzed without knowing or understanding all of the explicit underlying relationships between the various devices, sub-systems, and the like that make up the network system. When applied to a network operations center, the embodiments of the present invention can reduce the mean time to repair ("MTTR") by enabling more efficient root cause analysis. In particular, embodiments of the present invention utilize information retrieval and computational geometry concepts by applying vector formatting to event data. The event data is sorted into various n-dimensional event vectors and values are assigned to the n dimensions of the vectors based upon the frequency of event occurrences relating to the device in question and various preset weightings. Device weightings may be applied to each dimension of the equation, which corresponds to a domains or entities of the device, and event type weightings may be applied to various events that fall within each entity, such as to differently weight events having differing levels of criticality or severity. Additionally, mathematical techniques are then employed by the present invention measure the likeness of device statuses by performing similarity calculations using the n-dimensional equations established in this manner for each device.

In processes utilized in embodiments of the present invention, the event data is converted into an n-variable equation where n represents the number of different entities for the particular network element or object (e.g., device or resource) in question. For each of the entities, they are weighted according to importance to that type of device. For example, device that is a web server could have several entities, with a first entity being a CPU and a second entity being a memory (among other entities). These entities would be assigned entity weights according to their relative importance. A database server device could have entities that correspond to a CPU and a memory as well, however the corresponding entity weightings for this type of device could be different.

As utilized in preferred embodiments of the present invention, the weighting utilized compiling the events into the n-dimensional event equation can be broken up into two different sub-weights. In particular, weight can be assigned for each entity as described above, and also for every event type that fits into that entity, thus providing an entity weighting component to the equation and an event weighting component to the equation. If a critical event occurred in a critical entity area for that device, it would contribute to producing an relatively higher magnitude for that entity/dimension due to the high weighting that would be assigned. Alternatively, if an event occurred that was a low-priority environmental condition, but still in the critical entity area, the event vector component for this event would have a relatively smaller contribution to the magnitude due to overall weighting.

In preferred embodiments of the present invention, a software application in communication with the complex computing network in question receives reports of and data regarding events from network and systems management tools. The events received for each device in the computing network are decomposed and encoded using the n-dimensional equation as a mathematical vector, referred to herein as an event vector, where each vector dimension represents an event entity or domain for the device (or, equivalently, a dimension of the n-dimensional equation). The vector components are encoded such that critical events are weighted to contribute more to the magnitude of the device's vector than less critical events. Similarly, more critical event domains are more heavily weighted than less critical domains.

In preferred embodiments of the present invention, different sets of weights can be defined for use in different circumstances, enabling the weights to be used as a dynamic filter.

In embodiments of the invention, the service interface provided enables a user, such as an administrator and/or service engineer, to view the status of various subsystems and/or devices within a complex computing system in a manner that facilitates the diagnosing and addressing faults, errors and other conditions within the computing system. The methodology of the present invention, as embodied by related computerized processes and network architectures and systems, entails the production of a similarity plot, a visual representation of the relative severity and similarity of a various fault conditions occurring within a plurality of devices within the complex computing system. The visual representation visually depicts the various computing devices and/or resources within a three-dimensional grid located according to a first axis (e.g., a vertical axis) representing the severity of fault conditions being experienced by the devices/resources and second and third axes (e.g., horizontal width and depth axes) representing the similarity/disparity of the types of fault conditions being experienced by the devices/resources.

Such embodiments of the invention provide a service interface that displays representations of the statuses of individual devices of the complex computing system in virtual 3-D space according to determined similarity scores calculated from the event vectors for selected devices. A user can navigate this 3-D space to select a device and drill down to see a information, such as graphs or logs, relating to events (e.g., faults) for that device. As the embodiments of the present invention preferably employ real time data monitoring techniques, the invention can allow a user to observe changes in the monitored computing system over time on a device and system wide level.

According to certain aspects of these embodiments, once events for each device are encoded to form the event vector, the magnitude of each event vector is calculated. The results are stored, preferably in ascending order with largest magnitude at the top of the order. An information retrieval technique is thereafter used to calculate the similarity between the two vectors with the greatest magnitude. Similarity, represented in embodiments of the present invention by the angle between two event vectors (representing events on two devices), thereby serves as a measure of likeness between two vectors and therefore likeness between the events underlying the vectors. Vectors that are identical or scalar multiples have a similarity represented by a calculated 0° angle while totally dissimilar vectors have a similarity represented by a 90° degree angle. The similarity scores for the various vectors are thereafter used to plot representations of the various devices in a similarity plot.

As described herein, the invention enables systems and network administrators to see visually where events are occurring, along with their severity, in order to quickly isolate problems or recognize trends. Most preferably, devices that have the same kinds of events will be visually closer together, and this grouping changes dynamically over time as fault events and device statuses are updated. The present invention thereby converts the event data, typically stored, reported, and/or displayed as tabular data, into a visual display that virtually depicts the relationships between events for a device without requiring explicit knowledge of the underlying relationships of devices in the network. The visual display with navigation allows user to interact with the event information and identify other patterns in the data.

In certain embodiments of the invention, a small three dimensional graph, called a unit cube diagram, is drawn and displayed as the representation for each device with the three axes representing event frequency in the z-direction, the event domain (or device entities) in the y-direction, and time period in the x-direction. Most preferably, events within a given domain in accordance with certain embodiments of the invention may be represented as series of three dimensional blocks that are stacked on top of each other, with height of the stacked blocks thereby serving as an indicator of event frequency with a domain during a time period. Additionally, color coding preferably may be used to represent event severity to differentiate events of different severity from one another. Optionally, arrangement of event domains (e.g., depth in the y-direction) may be correlated to the relative importance of the event domain, and width (the x-direction) may match the time period in question for the event sample.

In most preferred embodiments of the present invention, representations for the event vectors are plotted in a new three dimensional space relative to the vector having the greatest magnitude (i.e., the highest weighted overall severity/criticality status) and displayed to the user, such as a service engineer. This graphing process begins by calculating the Euclidean distance between these two vectors. The event vector with the greatest magnitude ($^\wedge V_{max}$) is represented at (0, 0, $\|^\wedge V_{max}\|$) in the three dimensional space. The object with the second greatest magnitude ($^\wedge V_k$) is thereafter plotted at the coordinates (d·sine θ, d·cosine θ, $\|^\wedge V_k\|$), where θ represents the calculated similarity angle between the two event vectors, $\|^\wedge V_k\|$ is the magnitude of the vector, and d represents the Euclidean distance between the event vectors. This plotting step is iteratively repeated for every subsequent event vector. In this manner, a every event vector is compared to and plotted against the event vector with the greatest magnitude.

Additionally, statistical techniques such as "curve fitting" or linear regression optionally may be applied to the assigned coordinates for the plotting of each event vector that were generated as described above. This curve fitting can be used to yield an algebraic equation that describes an event surface, the surface bounded by the coordinates assigned to each event vector. Differentiation, a technique used in calculus is applied to the equation to determine the areas of the event surface that have the greatest rate of change. The areas of greatest rate of change represent possible root causes.

In this regard, one such embodiment of the invention includes a method for providing a visualization of fault events in a complex computing system for diagnosing and resolving such fault events. That method includes the processing of displays for a plurality of fault events occurring in a computing system. The method starts with defining devices in the computing system and entities of the devices, and then defining event types for the devices. Event data is received that reports the occurrence of events in the computing system where the reported events one of the various defined event types. Event vectors are then prepared for each of a selected plurality of the devices. Each of the event vectors have a number of dimensions corresponding to entities defined for a particular device corresponding to the event vector. The method further includes calculating a vector magnitude for each event vector and identifying one of the event vectors as having the greatest vector magnitude. Thereafter, similarity scores are calculated for each of the event vectors other than the event vector identified as having the greatest vector magnitude. These similarity scores are calculated relative to the event vector identified as having the greatest vector magnitude. Also, distances are calculated for each of the event vectors other than the event vector identified as having the greatest vector magnitude. Likewise, these distances are calculated relative to the event vector identified as having the greatest vector magnitude. The method next assigns plotting coordinates to each of the event vectors using each event vector's distance and similarity score. Finally, a similarity plot is generated and displayed using the assigned coordinates wherein the similarity plot visually depicts relationships between the selected plurality of devices in the network.

Additionally, another embodiment of the invention includes a computer readable medium having computer readable code thereon for providing a visualization of fault events in a complex computing system for diagnosing and resolving such fault events. The code includes definitions of devices in the computing system and entities of the devices, and definitions of event types for the devices. The code also includes instructions for receiving event data reporting the occurrence of events in the computing system, the reported events being of the event types. Additionally, the code provides instructions for preparing an event vector for each of a selected plurality of the devices where each the event vectors have a number of dimensions corresponding to entities defined for a particular device corresponding to the event vector. Further, instructions are provided for calculating a vector magnitude for each the event vectors and identifying one of the event vectors as having the greatest vector magnitude. Also, the code provides instructions for calculating similarity scores for each of the event vectors other than the event vector identified as having the greatest vector magnitude. These similarity scores are calculated relative to the event vector identified as having the greatest vector magnitude. The code provides instructions for calculating distances for each of the event vectors other than the event vector identified as having the greatest vector magnitude. Likewise, these distances are calculated relative to the event vector identified as having the greatest vector magnitude. Furthermore, the code includes instructions for assigning plotting coordinates to each of the event vectors using each event vector's distance and similarity score, and instructions for generating and displaying a similarity plot using the coordinates, wherein the similarity plot visually depicts relationships between the selected plurality of devices.

Further, another embodiment of the invention includes a computing system adapted to process and display information concerning a plurality of fault events occurring in a computing system. The computing system comprises a memory, a processor, a persistent data store, a communications interface, and an electronic interconnection mechanism coupling the memory, the processor, the persistent data store, and the communications interface. The persistent data store contains a database storing definitions of devices in the computing system, definitions of entities of the defined devices, and definitions of event types for the devices. The memory is encoded with a data visualization application that when performed on the processor provides a data visualization process for processing event information. The data visualization process causes the computing system to perform various operations, including the receiving of event data that reports the occurrence of events in the computing system where the reported events one of the various defined event types. Event vectors are then prepared according to the process for each of a selected plurality of the devices. Each of the event vectors have a number of dimensions corresponding to entities defined for a particular device corresponding to the event vector. The process further includes calculating a vector magnitude for each event vector and identifying one of the event vectors as having the greatest vector magnitude. Thereafter, the process calculates similarity scores for each of the event vectors other than the event vector identified as having the greatest vector magnitude. These similarity scores are calculated relative to the event vector identified as having the greatest vector magnitude. Also, distances are calculated according to the process for each of the event vectors other than the event vector identified as having the greatest vector magnitude. Likewise, these distances are calculated relative to the event vector identified as having the greatest vector magnitude. The process next assigns plotting coordinates to each of the event vectors using each event vector's distance and similarity score. Finally, a similarity plot is generated and displayed by the process using the assigned coordinates wherein the similarity plot visually depicts relationships between the selected plurality of devices in the network.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing visualization and diagnosis of complex computing systems as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention.

The system of the invention can be distributed between many software processes on several data communications devices, or all processes could run on a small set of dedicated computers, or on one computer alone. Likewise, it will be understood by one skilled in the art that the embodiments of the invention can be embodied strictly as a software program, as software and hardware, or as hardware and/or circuitry alone, such as within a data communications device.

The various embodiments of the invention having thus been generally described, several illustrative embodiments will hereafter be discussed with particular reference to several attached drawings.

DETAILED DESCRIPTION OF THE PREFERRED EMBODIMENTS

When a service engineer of a computing system needs to investigate fault events for a data center, a control loop typically is followed to constantly monitor the system and look for events to handle. The control loop is a logical system by which events can be detected and dealt with, and can be conceptualized as involving four general steps: monitoring events in the system, analyzing suspect events (such as faults), deducing underlying causes of the events, and executing actions to remedy the causes. In particular, the system engineer first looks for the events that are detected by the sensors possibly from different sources (e.g., a log file, remote telemetry data or an in-memory process). Traditionally, a network engineer uses the previously established knowledge base (e.g., experience and knowledge of the particular network's current configuration) to understand a specific event he or she is investigating. This control process, while intuitive and common for service engineers, is nonetheless difficult. It is complicated by the sheer size and complicated natures of today's complex computing systems. As described in the preferred embodiments hereafter, the present invention provides a tool to assist such service engineers in deducing underlying causes of faults independently of detailed information concerning the configuration of the network.

Figure 1:
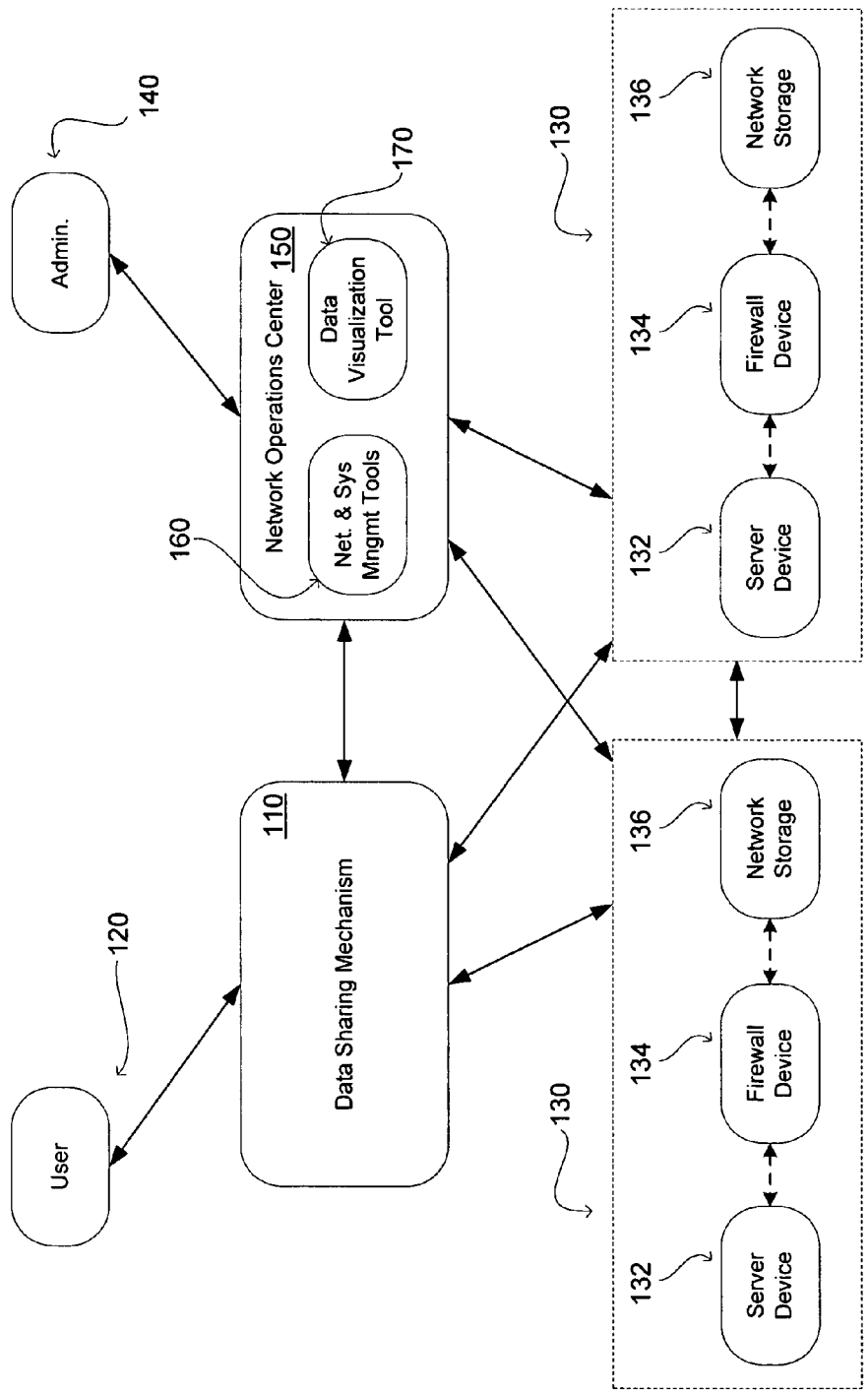
FIG. 1 is a schematic diagram depicting a suitable architecture for detecting, analyzing and displaying data concerning events and associated computing devices according to embodiments of the present invention.

By way of example, FIG. 1 depicts a complex computer network 100 that is made up of various resource centers 130 that are inter-connected in conventional fashion to form the network 100. The network 100 and its various resource centers 130 are managed by a network operations center 150, which includes typical network and system management tools 160 such as conventional event/fault management, reporting and tracking software. One or more users 120 interact with the network resources centers 130 through the network's data sharing mechanism 110, and one more administrators 140 interact with the network operations center 150. The data sharing mechanism 110 comprises a network resource management and organization platform (e.g., iFabric) which allocates and associates resources and sub-systems within the network as is known in the art.

Each system resource center 130 could include, for example, various service devices 132, firewall devices 134, network storage resources 136, and other known devices or resources that are managed by the platform. Each center 130 could be, for example, a commercial server farm located at a particular location, the resources located locally within a particular laboratory or floor in a larger networked building, or the resources forming a sub-system (e.g., the accounting system in a large corporate network) within a larger network system. The servers could comprise a personal computer, a mainframe computer, a workstation or other similar type devices. Likewise, data resources could include databases, data structures or the like, and storage resources may include magnetic tape storage, semiconductor storage, a hard drive device, a CD-ROM, a DVD-ROM, a computer diskette, or similar type devices. While two centers 130 are shown, it should be appreciated that any number of farms could be included in the computer network 100. Furthermore, other conventional computing, data, storage and interface resources, including but not limited to servers, network switches, firewalls and the like could also be utilized in each center. Examples of computing devices that typically comprise resources within such computing systems include, but are not limited to, load balancers, firewalls, servers, network attached storage (NAS), and Ethernet ports. Other resources typically monitored by operations center 150 include, but are not limited to, disks, VLANs, subnets, and IP Addresses.

Each such device and resource in centers 130 can, in conventional fashion, be understood as having a number of entities running on it. For example, these might be network services. The set of entities that can run on any device or resource can be thought of as the "domain" of the that device.

As described above, additional resources and resource types may be added to a center 130 or to the larger network 100 from an available resource pool (not depicted), and likewise resources may also be subtracted from a farm which may go back into the resource pool. With such an arrangement, a user 120 can access a computing resource located anywhere in the network 100 (or be automatically allocated resources by mechanism 110) while also utilizing data resources or storage resources located elsewhere in the network 100. Resources thus can be mixed and matched to satisfy load/bandwidth needs or concerns or to prevent down time in the event of a resource failure. Mechanism 100 (which is controlled and configured by network service engineers such as administrators 140) thereby controls access to the different resources as well as manages the resources within the computing network 100.

Generally, events in such a networked computing system may include those events that are monitored and tracked as failures in the computing system. For example, when a first CPU device fails it typically would be replaced by another CPU device automatically to meet the requirements for the end user. In such circumstances, one or more events would be generated, including a failure event detailing information relating to how and/or why the first CPU device failed. A typical self-healing architecture is expected to recover automatically from such a failure. However, it may be necessary to examine the device that exhibited failure symptoms. In particular, a service engineer would need to diagnose and identify the underlying cause(s) of the failure in the device, to fix the device remotely and to return the device back to the computing system's resource pool.

One skilled in the art will recognize that a fault event may be generally characterized as an imperfect condition in one or more devices within the computing system that may or may not cause a visible error condition, such as an unintended behavior. For example, a typical unintended behavior could include a sudden drop in the packet transfer speed of a particular segment of a local area networks (LAN), which behavior could result in a fault/error message being delivered to a fault monitoring system used by service engineers. Service engineers rely upon their fault management system for the detection of faults such that they may be identified and, subsequently, diagnosed and corrected in a way to effectively eliminate unintended behavior and remediate the underlying fault.

In embodiments of the invention whenever a device fails it is anticipated that the failure details would be exported in typical fashion to a control panel of the fault management and tracking portions of the network and system management tools 160. This is the typical manner by which they would be communicated to an appropriate administrator 140, such as a service engineer, via an administrator's user interface. Further, as is conventional in complex computing systems, upon an indication of failure event, it is expected that the network would be (and preferably is) self-healing such that the failed device in the resource pool automatically is replaced with another available device. Therefore, it should be appreciated that when a device fails, failure event and other details are exported to the network operations center 150, which ultimately leads to information concerning the failure being reported to a service engineer by tools 160. These tools 160, for example, could provide the service engineer with interfaces to drill down to collect information from a single resource level such as a server or a network switch. Thus, in embodiments of the invention, tools 160 could be used by a service engineer to lookup the status of various resources linked to an event, and then obtain and review any telemetry data, metadata, and the like produced by the system in relation to the resources and event.

As depicted, network operations center 150 also provides administrators 140 with a data visualization tool 170 according to the present invention. This tool comprises the data handling and logic routines as hereinafter described to provide a network service engineer with a service interface that allows him or her to communicate with and examine devices, resources and entities within one or more network systems and sub-systems, such as network 100 and centers 130, to receive and monitor event data from those devices, resources and entities, and to be provided with a visual and interactive representation regarding the relative status of various sub-systems and/or devices within the computing system.

In most preferred embodiments of the invention, as will be described in further detail below, the data visualization tool 170 processes event record data for devices of interest to the user and then displays graphic representations of the statuses of individual devices of the complex computing system in virtual 3-D space. The graphic representations of the individual devices incorporate entity event information for each device and the graphic representations of each device are displayed in a manner such that they are organized in relation to other device representations according to determined similarity scores calculated from the event records for the various devices. A user can navigate this 3-D space to select a representation device and drill down to see various detailed information, such as graphs or logs, relating to events (e.g., faults) for that device. As the embodiments of the present invention preferably employ real time data monitoring techniques, the invention can allow a user to observe changes in the monitored computing system over various time periods on a device, sub-system and system wide level.

Understandably, the service interface of data visualization tool 170 enables administrators 140 and other users to configure the operation of the tool 170 (e.g., making time period and device/entity weighting definitions, setting display preferences and defaults, and the like). The operation of data visualization tool 170 in preferred embodiments of the invention will be better understood in conjunction with the following discussion of the remaining drawings. One skilled in the art will readily appreciate the various interfaces and functionalities necessary and/or desirable for operation of tool 170 from the description herein.

Figure 2:
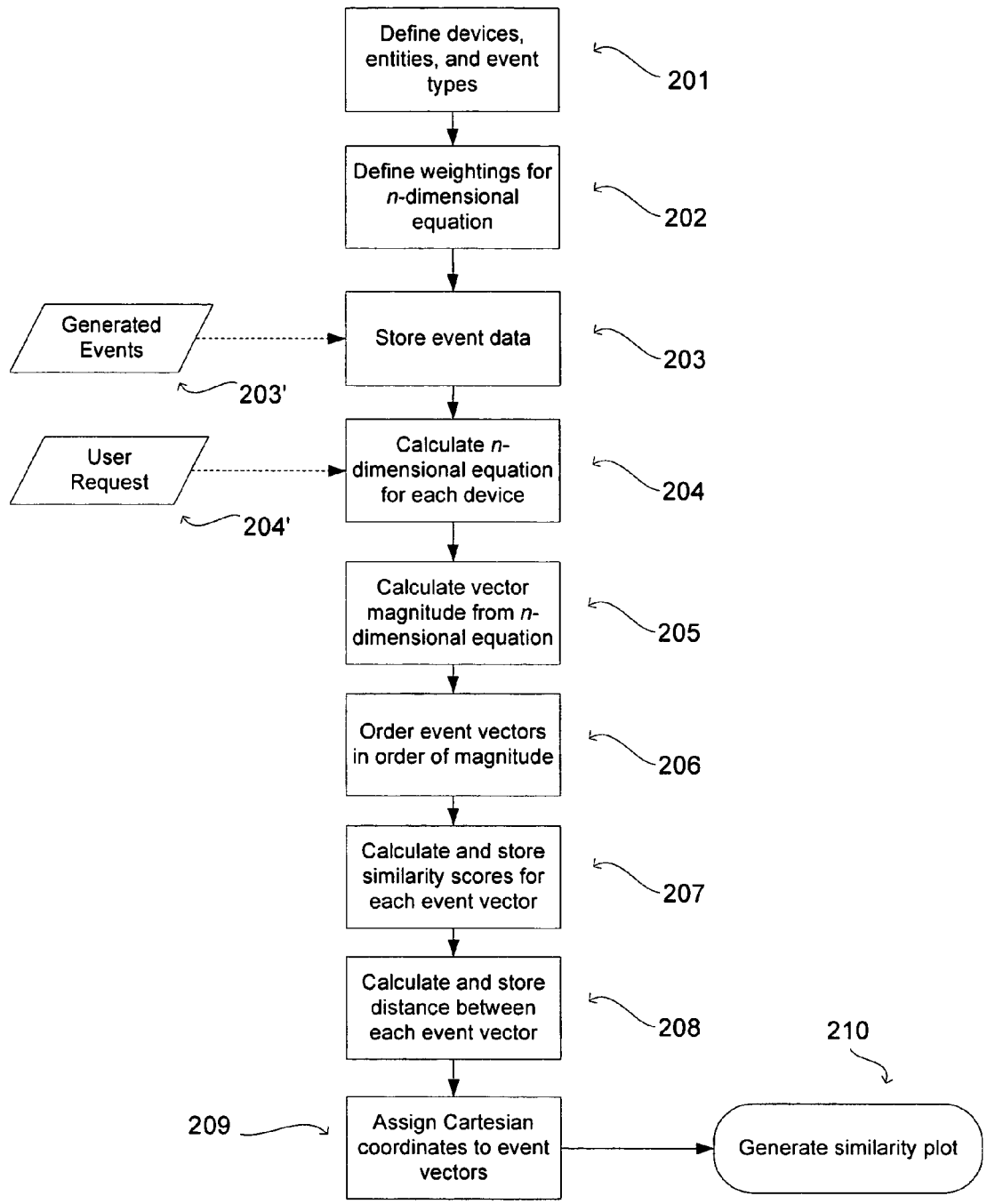
FIG. 2 is a schematic diagram depicting a process for preparing data visualization displays according to an embodiment of the invention.

Turning now to FIG. 2, there is depicted a flow diagram for a data visualization process 200 enabled by a data visualization tool (such as tool 170) according to one preferred embodiment of the present invention. As shown in FIG. 2, process 200 begins at step 201 with an administrator or other user defining entities (or event domains) for each device type and event types for each so-defined entity. Understandably, this would repeated for each device (or device type) within a network for which one would want to utilize process 200. At step 202, the user then defines the weighting approach (e.g., one level or two level) and weighting coefficients to be later used by process 200 in the n-dimensional equation for each device. These weighting coefficients are defined for each entity, and, if two level weighting is used, each event type within each entity.

As different devices and resources may have various different characteristics, the n-dimensional equation for each device takes various different forms. However, in embodiments of the invention, the n-dimensional equation for any device D may take the following generic form $$D(t) = \sum_{i=1}^{n} F_i(t) \cdot W_i \cdot X_i \qquad \text{(Eq. 1)}$$

where n is the number of entities of the device D (and thus the number of dimensions in the n-dimensional equation), $X_i$ is the variable identifying each dimension/entity, $W_i$ is the entity weight for a given entity i, and $F_i(t)$ is a frequency factor for each event corresponding to entity i (i.e., falling within the domain of i) over time period t. Optionally, this frequency factor $F_i$ can be an integer count of the events falling within the domain over the time period t in question or, preferably, the frequency factor can reflect a weighted count. Where frequency factor $F_i$ is weighted, each value $F_i$ in Eq. 1 can be represented as and calculated from the equation $$F_i(t) = \sum_{j_i=1}^{v} f_{j_i}(t) \cdot w_{j_i} \qquad \text{(Eq. 2)}$$

where v represents the number of event types (e.g., informational, minor, major, critical, chargeable) for entity i, and, for each particular event type $j_i$, $f_{j_i}(t)$ is the frequency (or count)

of events during the given time period t for event i and of type j, and $w_{ji}$ is the event type weight to be applied to that frequency $f_{ji}$.

Thus, for example, if device $D_1$ had three domains, then Eq. 1 would reduce to the following.

$$D_1(t)=F_1(t) \cdot W_1 \cdot X_1 + F_2(t) \cdot W_2 \cdot X_2 + F_3(t) \cdot W_3 \cdot X_3$$

Similarly, if the entity corresponding to variable $X_3$ for device $D_1$ had five different event types (a-e) with corresponding different weights, then Eq. 2 would reduce to the following.

$$F_3(t)=f_a(t) \cdot w_a + f_b(t) \cdot w_b + f_c(t) \cdot w_c + f_d(t) \cdot w_d + f_e(t) \cdot w_e$$

Understandably, if all the entity weights $w_{ji}$ in Eq. 2 are set equal to unity, then $F_i(t)$ reduces to merely an integer count of the number of events for a given entity i (of all event types) over time period t.

As event records flow in 203' to the fault management system, they are stored in conventional fashion at step 203 as event records detailing, for example, their time of occurrence, farm IDs, device IDs, entity IDs, severity types, event types, and the like. Understandably, such storing of event records may be performed by a fault management and tracking tool of the network. For example, an event database may be compiled by various means and that database would then be made available to the data visualization tool 170 and process 200 for the data operations described below.

Upon a request 204', such as from an administrator or other user of the data visualization tool, the process 200 would begin to calculate the various coefficients for the n-dimensional equation for each device at step 204. Understandably, request 204' may directed toward events occurring in a certain time, relating to a certain sub-set of devices or sub-systems, to a particular data center, or the like. Further, such request may be automated. For example, the data visualization tool can be configured to provide an automatically refreshing display such that new calculations and an updated display are provided every ten minutes.

Step 204 of process 200 is performed by the tool looking up the appropriate n-dimensional equation entities and weightings as previously defined by the user (such as in previous steps 201 and 202), obtaining event data of interest (e.g., relating to devices of interest during a time period of interest) from the event database, and then performing calculations as dictated by the appropriate weightings and event data to reduce the data into the form of a reduced n-dimensional equation. For example, a request may stipulate that the number of events occurring in a selected time period $T_{34}$ should be collected and then analyzed by the data visualization tool (the time period being of interest to the service engineer or other administrator) for a group of devices in a certain farm, which includes device $D_1$. The event data collected from the event database may show an entity $X_1$ for device $D_1$ that has event counts as depicted in Table 1 below.

TABLE 1

| Entity $X_1$ at time period $T_{34}$ for device $D_1$ | |
|---|---|
| Minor events | 12 |
| Major events | 3 |
| Critical events | 7 |
| Informational events | 43 |

Applying the event information as depicted above to Eq. 2, the events entity $X_1$ of device $D_1$ are aggregated into a weighted frequency the weights are assigned based on the relative severity of the events for that particular type of entity. The following relationship follows for the weighted sum of entity $X_1$ at time $T_{34}$ and entity weights $w_{type}$.

$$F_{X_1}(t=T_{34})=12 w_{X_1\,minor} + 3 w_{X_1\,major} + 7 w_{X_1\,critical} + 43 w_{X_1\,info}$$

Setting the entity weights (arbitrarily here for purposes of illustration) to 0.75 for minor events, 1.5 for major events, 2.25 for critical events, and 0.2 for informational events, the frequency calculation for $F_{X_1}$ becomes $$F_{X_1}(t=T_{34})=12 \cdot 0.75 + 3 \cdot 1.5 + 7 \cdot 2.25 + 43 \cdot 0.2$$

such that when event type weighting is employed $F_{X_1}$ is equal to the value 37.85, which then may be incorporated into the version of Eq. 1 for device $D_1$ at time period $T_{34}$. Conversely, if no event type weighting was employed for entity $X_1$, then the value of $F_{X_1}$ would be the straightforward sum of the frequencies in Table 1, or 65.

Assuming device $D_1$ had three entities, then its 3-dimensional (n=3) equation reduced from Eq. 1 for time period $T_{34}$ using event type weightings might reduce to, for example, the following.

$$D_1(t=T_{34})=37.85 \cdot W_1 \cdot X_1 + 14.70 \cdot W_2 \cdot X_2 + 22.45 \cdot W_3 \cdot X_3$$

Appropriate values would then be applied to entity weights $W_1$-$W_3$ (having likewise been previously defined) to get a final fully reduced 3-dimensional equation for device $D_1$. Using values for entity weights W1 (1), W2 (3.5) and W3 (1.5) for purposes of illustration, the 3-dimensional equation for $D_1$ could become, for example, the following.

$$D_1(t=T_{34})=37.85 X_1 + 51.45 X_2 + 33.675 X_3$$

The n-dimensional equation for each selected device during step 204 would be computed in like fashion.

As will be understood by one skilled in the art, multi-variable equations like Eq. 1 can be readily expressed in vector format by treating the entity variables $X_i$ as unit vectors to facilitate handling of the equations. For example, the fully reduced 3-dimensional equation for device $D_1$ shown immediately above alternatively could be expressed as a 3-dimensional vector $\hat{D}_1$ in the following manner.

$$\hat{D}_1(t=T_{34})=(37.85, 51.45, 33.675)$$

Embodiments of the present invention utilize vector formatting of the n-dimensional equations in this manner to facilitate the transfer of information from n-variables into a graphical presentation on a standard computer display where it can be most effectively used by network service engineers. Most common computer displays provide 2-dimensional imaging capabilities, and computer rendering techniques make it possible to create relatively clear and understandable 3 or 4-dimensional plots or graphs on those screens. Notably, however, it frequently is the case that the devices of a computer network will have in excess of three entities, thus making displaying of information concerning the n-dimensional equations in a visual format problematic. In particular, there is a need to compress the information contained in each device's event vector without losing information such that device statuses can displayed visually in three dimensions (and compared visually in a meaningful way).

Preferred embodiments of the invention that utilize process 200 thus convert the n-dimensional equations into event vectors as described above in order to facilitate the creation of visual and interactive displays showing the similarity of various devices. In particular, step 205 of process 200 as depicted in FIG. 2 comprises the calculating of event vector magnitudes for each device's n-dimensional equation calculated in step 204. Thus each equation is converted into vector notation as described above, and then magnitude of each such event vector is calculated.

As will be understood by one skilled in the art, the magnitude of a vector can be calculated by known mathematical techniques. The "Euclidean" length of a vector $\hat{a}=(a_1, a_2, \ldots, a_n)$, denoted $\|\hat{a}\|$, may be defined as $$\|\hat{a}\| = \sqrt{a_1^2 + a_2^2 + \ldots + a_n^2} \qquad \text{(Eq. 3)}$$

Herein, the length of a device's event vector may be equivalently referred to as the event vector's magnitude.

After each of the event vector magnitudes are calculated using Eq. 3, the vectors are placed in order according to their magnitudes, from highest magnitude to lowest magnitude at step 206. In this regard, embodiments of the present invention are relying upon the weightings assigned to each device entity and event type to identify those devices (i.e., those with the highest magnitude of events) in the time period in question that are exhibiting the "worst" operating characteristics (e.g., most faults of high criticality in high event domains).

Another advantage of using event vectors herein is that mathematical vector operations may be used to assess the similarity of two vectors. The similarity between two object vectors, $\hat{a}$ and $\hat{b}$ according to preferred embodiments of the present invention is defined as:

$$sim(\hat{a}, \hat{b}) = \frac{\hat{a} \circ \hat{b}}{\|\hat{a}\| \cdot \|\hat{b}\|} = \cos\theta \qquad \text{(Eq. 4)}$$

where $\theta$ is the angle between multi-dimensional vectors $\hat{a}$ and $\hat{b}$. Intuitively, the ratio gets closer to 1 the closer the individual entity magnitudes (i.e., the individual coefficients of the n-dimensional equation) of the devices are. For example, consider the following three event vectors, $\hat{c}$, $\hat{d}$, and $\hat{e}$, which all have three dimensions.

$\hat{c} = (6, 13, 19)$
$\hat{d} = (28, 0, 12)$
$\hat{e} = (5, 12, 19)$

According to Eq. 4 provided above, their similarities can be computed as follows.

$$sim(\hat{c}, \hat{d}) = \frac{\hat{c} \circ \hat{d}}{\|\hat{c}\| \cdot \|\hat{d}\|}$$
$$= \frac{(6 \cdot 28) + (13 \cdot 0) + (19 \cdot 12)}{\sqrt{6^2 + 13^2 + 19^2} \cdot \sqrt{28^2 + 0^2 + 12^2}}$$
$$= \frac{369}{\sqrt{566} \cdot \sqrt{928}}$$
$$\approx 0.55$$

$$sim(\hat{c}, \hat{e}) = \frac{\hat{c} \circ \hat{e}}{\|\hat{c}\| \cdot \|\hat{e}\|}$$
$$= \frac{(6 \cdot 5) + (13 \cdot 12) + (19 \cdot 19)}{\sqrt{566} \cdot \sqrt{5^2 + 12^2 + 19^2}}$$
$$= \frac{547}{\sqrt{566} \cdot \sqrt{530}}$$
$$\approx 1.00$$

-continued $$sim(\hat{d}, \hat{e}) = \frac{\hat{d} \circ \hat{e}}{\|\hat{d}\| \cdot \|\hat{e}\|}$$
$$= \frac{(28 \cdot 5) + (0 \cdot 12) + (12 \cdot 19)}{\sqrt{28^2 + 0^2 + 12^2} \cdot \sqrt{5^2 + 12^2 + 19^2}}$$
$$= \frac{368}{\sqrt{928} \cdot \sqrt{530}}$$
$$\approx 0.52$$

As one would expect from comparing the individual values of the three domains for each event vector, event vectors $\hat{c}$ and $\hat{e}$ are very similar because they have similar event counts (or "entity magnitudes") for all three entities, while $\hat{d}$ is not very similar to either of the other two objects. Embodiments of the present invention take this similarity calculation as a measure of whether similar events are occurring to the compared devices. A high similarity (near 1) from the similarity calculation would therefore be taken as an indication that the devices have a relatively similar statuses and this similarity information can be used by a service engineer to deduce whether there is an increased probability that the devices have high similarity statuses due to having common or similar underlying causes that are giving rise to similar event characteristics.

Thus as described in further detail below, preferred embodiments of the present invention provide data visualization displays in the form of similarity plots that utilize similarity scores calculated according to Eq. 4 as exemplified above to depict the relative similarity and differences in status amongst various devices of interest. Notably, the similarity plots can take on various forms so long as the distance between representations of different devices in the similarity plot depict the relative similarity of those device's statuses. For example, a similarity plot according to the present invention would depict representations of devices having similar event vectors, such as $\hat{c}$ and $\hat{e}$ above, grouped together, while dissimilar event vectors, such as $\hat{d}$, would be a proportional distance away.

In this regard, steps 207 through 210 of process 200 utilize similarity information of the ranked event vectors to produce a preferred type of similarity plot whereby device representations are mapped into three-dimensional Cartesian space. To perform this mapping, it is necessary to convert the n-dimensional information for the various devices into three dimensions, or x, y, and z Cartesian coordinates. For this mapping, process 200 at step 207 calculates and stores similarity scores for each of the event vectors. These similarity scores are performed relative to the event vector that was identified as having the greatest event magnitude at step 206. This particular event vector, termed the base event vector, is denoted generally herein as $\hat{B}ase$. Thus, at step 206 a similarity score is calculated for each event vector other than the base event vector by using Eq. 4 and inputting the event vector values for each entity of the base event vector and the event vector in question. Understandably, no similarity score would be calculated for the base event vector as it would be compared to itself. These similarity scores are then stored.

Next, at step 208, the Euclidean distance between the base event vector and every other event vector is calculated as another measure of device status correlation. The Euclidean distance between two vectors, $\hat{a}=(a_1, a_2, \ldots, a_n)$ and $\hat{b}=(b_1, b_2, \ldots, b_n)$, may be defined according to the following equation.

$$\mathrm{dist}(\char"5E a, \char"5E b) = \sqrt{(a_1-b_1)^2 + (a_2-b_2)^2 + \ldots + (a_n-b_n)^2} \quad \text{(Eq. 5)}$$

As with the similarity scores, the Euclidean distance will be calculated for each event vector (other than the base event vector) relative to the base event vector and then stored.

At step 209, process 200 thereafter utilizes the magnitudes, similarity scores, and distances for each event vector to assign suitable Cartesian coordinates. Since the base event vector ^Base does not have a similarity score or a distance calculated, it may be arbitrarily assigned any spot in the 3-dimensional Cartesian space and then each event vector may be mapped relative thereto. In preferred embodiments of the invention, the base event vector is assigned the coordinates (0, 0, ‖^Base‖) such that it is plotted in the similarity plot at the top center of the display relative to the axes. The rest of the objects are mapped using their particular event vector magnitude as their z coordinate, and placed relative to ^Base on the within the x and y directions based upon their stored values obtained from the similarity score calculations and the Euclidean distance calculations. In most preferred embodiments of the invention, at step 209 the x and y coordinates for plotting a given device in the similarity plot are assigned such that each event vector ^$V_k$ (other than ^Base) is plotted at the coordinates $$(d_{\char"5E V_k}\sin\theta_{\char"5E V_k},\ d_{\char"5E V_k}\cos\theta_{\char"5E V_k},\ \|\char"5E V_k\|) \quad \text{(Def. 1)}$$

where $\theta_{\char"5E V_k}$ is the angle between the event vector ^$V_k$ and base event vector ^Base, and $d_{\char"5E V_k}$ is the Euclidean distance between vectors ^$V_k$ and ^Base, wherein $\theta_{\char"5E V_k}$ may be calculated from the similarity score relationship $$\theta_{\char"5E V_k} = \cos^{-1}[\mathrm{sim}(\char"5E V_k, \char"5E \mathrm{Base})] \quad \text{(Eq. 6)}$$

through the rearrangement of Eq. 4 above.

Once all Cartesian mapping coordinates are obtained at step 209, the process 200 can conclude with the generating of a display of a similarity plot at step 210 using these Cartesian mapping coordinates.

Thus, in the particular embodiments of the invention which utilize this preferred Cartesian coordinate assigning construct, the most similar devices to the device having the highest magnitude event vector would have y coordinate values assigned that are approaching zero (because sin θ approaches zero when θ approaches zero and θ approaches zero as similarity increases). Thus, upon reviewing a displayed similarity plot, the representations of devices depicted as being in near the plane formed by the intersecting y and z axes (or in near vertical alignment with the base event vector device when a user views the similarity plot with the y-axis pointing toward him or her) could be expected to have similar underlying events (and thus similar statuses) to the base event vector. Furthermore, other representations of devices in the similarity plot that similar x and y coordinate values (that align near vertically) may raise an inference that those devices have similar event vectors and underlying statuses. This could provide the user with a motivation to explore these devices further, such as by forming a new similarity plot focusing only on these clustered devices.

As will be readily appreciated by one skilled in the art, the similarity plot can provide a view of the entire network (or portions thereof) which consists of devices in the system laid out in a virtualized 3-D space. The location of the devices in the similarity is determined by their relative statuses, as reflected by their event vectors and determined from events for each device over the time period in question. As a general matter, the preferred layout of the similarity plot works such that if two objects (e.g., devices) have the same kinds of events occurring they will be horizontally close together. If they have similar frequency and severity of events, they will have similar heights.

Figure 3A:
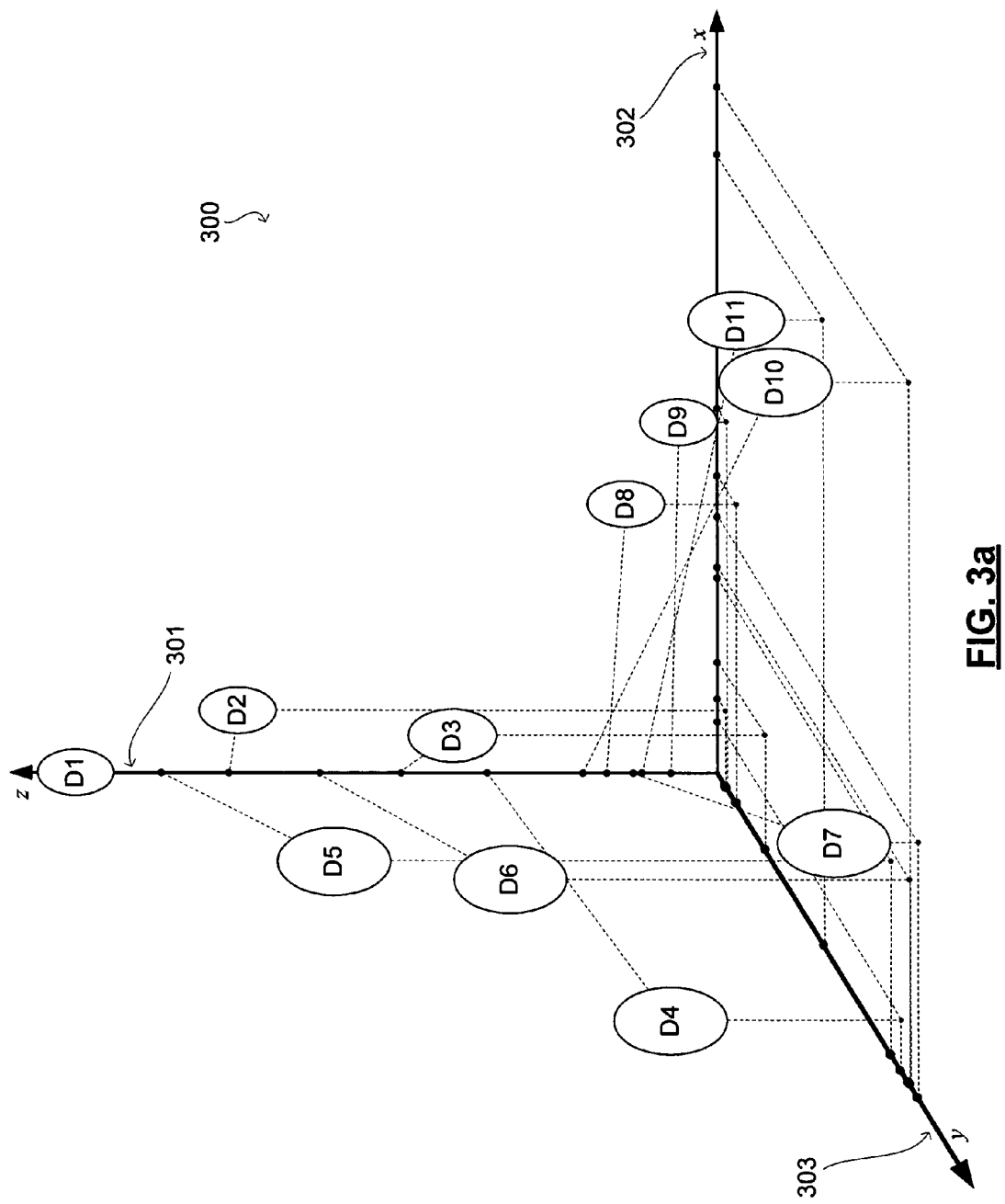
FIG. 3a through FIG. 3c are schematic diagrams depicting the basic layout of, use of, and navigation within similarity plots as used in certain embodiments of the present invention to visually depict the relative severity and similarity of faults and error conditions for various computing devices within a networked computing system.
Figure 3B:
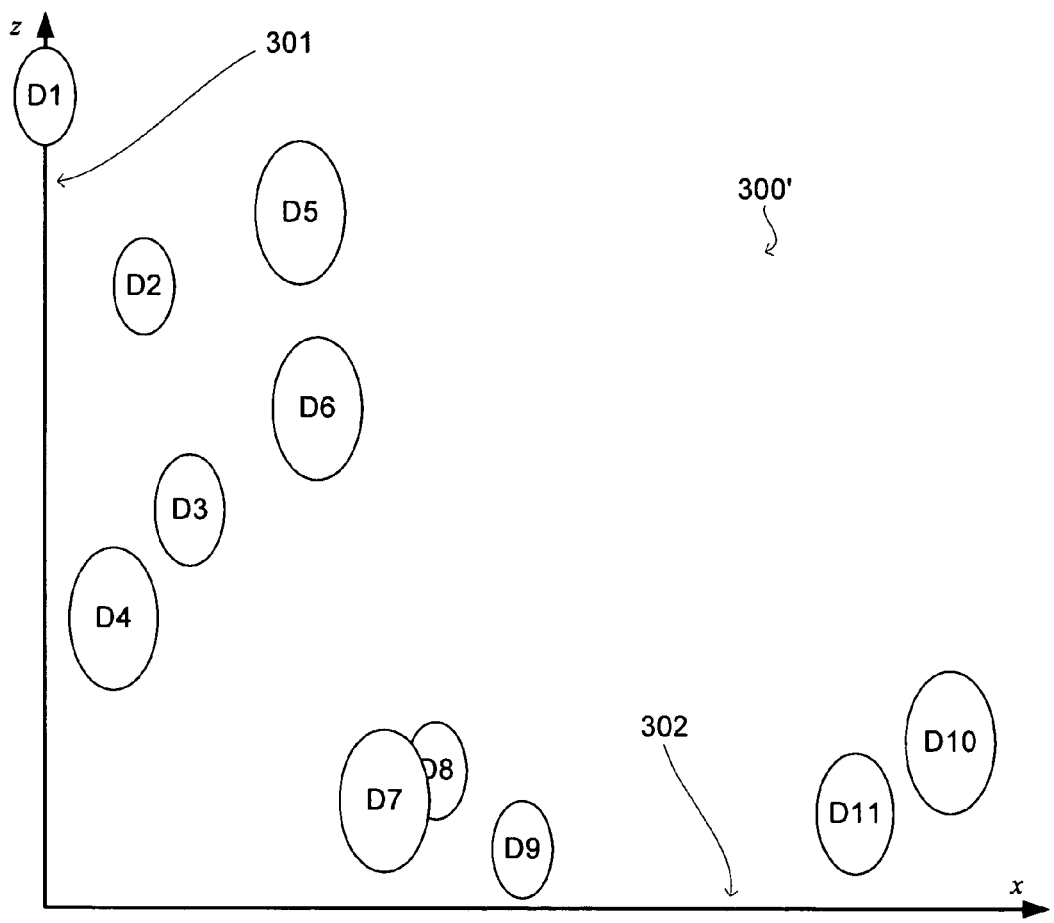
Figure 3C:
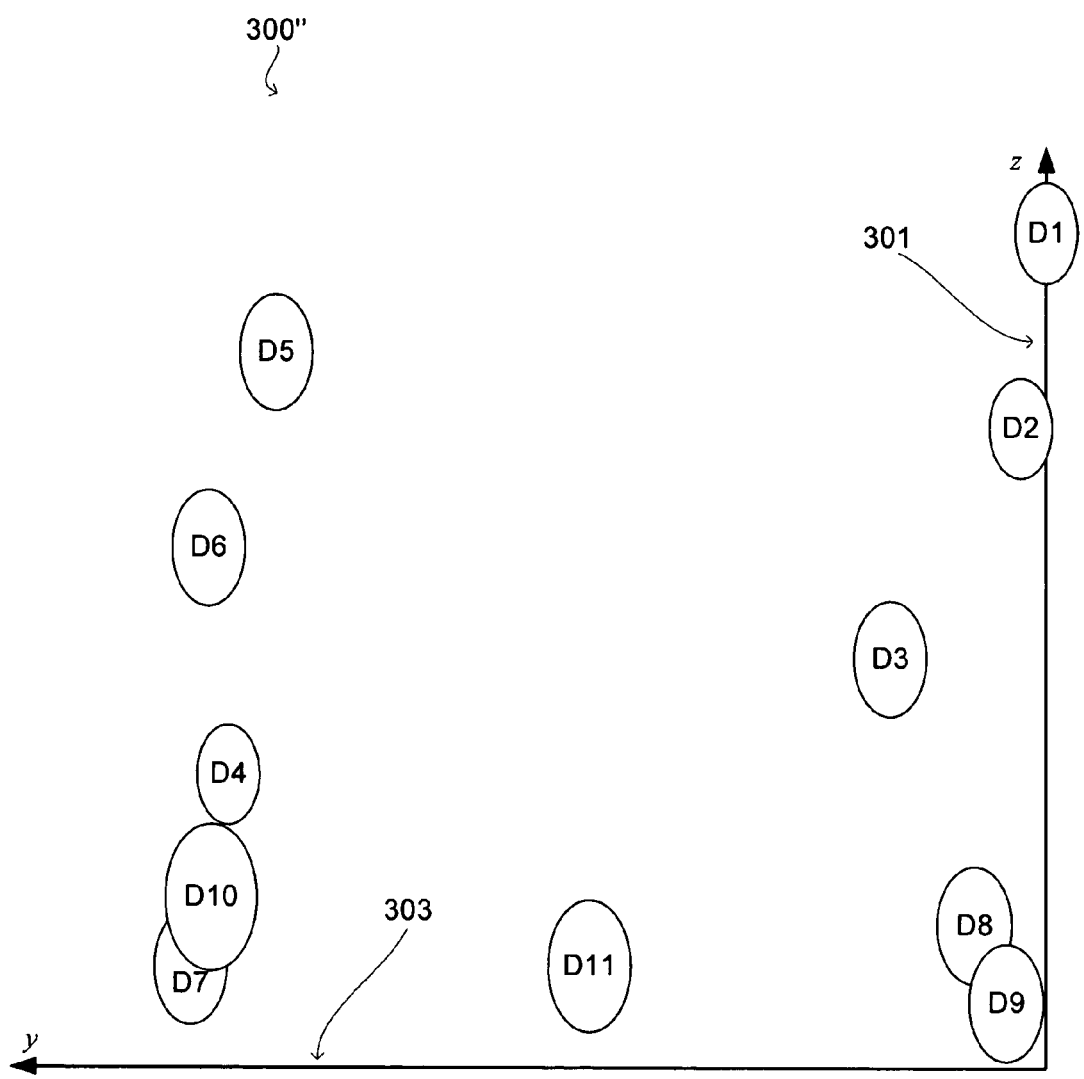

FIG. 3a through FIG. 3c are schematic diagrams depicting the basic layout of, use of, and navigation within similarity plots as used in those embodiments of the present invention using Cartesian coordinate mapping as described above with respect to FIG. 2. One of ordinary skill in the art will recognize that the event vector plotting equations depicted above provide certain significances to plotted events depending upon where they fall in the three dimensional space of the display. Most obviously, event vectors having the greatest magnitude fall towards the top of the display (assuming the positive end of the z-axis is oriented toward the top of the screen in conventional fashion). The highest magnitude event vector is plotted near the top of the display directly on the z-axis, with the other event vectors plotted at various points beneath it. If, for example, it happens that there are two event vectors with the same magnitude, they may be at the same vertical elevation in the display but their x and y coordinates won't allow them to line up perfectly right unless they also have nearly identical similarity to the highest magnitude reference event vector used as the reference vector.

FIG. 3a in particular depicts a similarity plot 300 as may be used in such embodiments of the invention. As shown in FIG. 3a, various representations of devices D1 through D11 are plotted in 3-dimensional space defined by z-axis 301, x-axis 302, and y-axis 303. It should be clear that the representation of device D1 is plotted directly on the z-axis and near the top of the similarity plot 300, thus marking it as the device having the highest event vector magnitude. By viewing similarity plot 300, a user can visually assess the relative severity and similarity of accumulated faults and error conditions for various computing devices within a networked computing system.

As noted above, similarity plot 300, if it used the preferred coordinate assigning convention described above, would place devices having event vectors with the most similarity to the highest magnitude event vector close to the plane formed by the y and z axes (303 and 301, respectively). Thus, it can be seen from similarity plot 300 that device D4 is closest to this plane (i.e., has the smallest value for x), followed by device D2, and then device D3. Notably, however, device D4 has a much lower event vector magnitude than device D1, and, in fact has lower magnitudes than both device D3 and device D2.

For sake of better illustration, FIG. 3b depicts similarity plot 300 from FIG. 3a in a view 300' perpendicular to the plane formed by the z axis 301 and x axis 302, while FIG. 3c depicts similarity plot 300 from FIG. 3a in a view 300" perpendicular to the plane formed by the z axis 301 and y axis 303. In these views 300' and 300", the device representations D1 through D11 appear projected onto the depicted axes plane providing a more clear illustration of the relative positioning of the various representations of the devices.

In FIG. 3b, for example, it is easy to see that the representation for device D4 is closest to the z axis, followed by the representation for device D2 (meaning it is closest to the z-y plane). Similarly, it can be easily gauged that the representation for device D5 is the second highest in the similarity plot 300, indicating that device D5 would have the highest magnitude event vector behind that of device D1. In preferred embodiments of the present invention, as described below, it is expected that the data visualization tool will allow users to view the similarity plot as a 3-D rendering on a standard computer display. However, the tool will utilize 3-D rendering techniques that enable the user to rotate and tilt the similarity plot (such as by a click and drag operation with a mouse) as well as to zoom in or out. In this manner, the user will be able to interact with the similarity plot display and obtain as much information from the display as possible.

The similarity plot 300 as depicted FIG. 3a contains various broken lines that project the position of each representation of devices D1 through D11 onto the various axes 301-303. These dotted lines are optional and are included in FIG. 3a for making the relative positions of the various device representations more clear. It should be understood that such broken lines would introduce significant clutter to a similarity plot as the number of devices grow. Thus, the broken lines could not be present entirely or, optionally, could be made to appear on a display by mouse-over operations or the like.

Furthermore, comparison of all of FIG. 3a through 3c shows that, for example, the representations for devices D5 and D6 are clustered relatively close to one another in terms of x and y coordinates and both have relatively high weighted event magnitudes. The representation for device D7 also has very similar x and y coordinates to those for devices D5 and D6. Thus, a user of the data visualization tool could deduce that events D5, D6, and D7 are likely to be experiencing similar problems given their similar event vectors. Thus, the user could decide to further investigate the events for these devices, and perhaps initialize a new similarity plot based upon one or more of these devices (defined as the base vector despite magnitude) or a new similarity plot for certain subsystems containing those devices.

Since the preferred embodiments of the present invention utilize renditions of the 3 dimensional plots that permits users to move around within the space, it should be appreciated that one may rotate the display space such that the y-axis points towards the user and the x-axis points side to side. With the display oriented in this manner, the user might see event vectors plotted such that they are lined up with the base event vector or each other (substantially above and below one another). Upon seeing such groupings of event vector plots, the user can deduce that certain groups of devices or other resources have similar things occurring that effect them, but, for some reason, certain ones are having experiencing the occurrences with a higher magnitude. Users could thereafter rotate the displays as desired to have the y-plane oriented pointing toward them to look for things lined up vertically (or close to being lined up vertically) and then perform various drill down functions on devices thereby identified as being of interest as described herein.

Considering the process 200 of FIG. 2 and the similarity plot 300 in FIG. 3a collectively, it should apparent to one skilled in the art that the coordinate assignments described above via Def. 1 are not the only such coordinates that can be used. Alternatively, but less preferred, the embodiments of the invention can utilize spherical or cylindrical 3-dimensional coordinate systems to assign plotting coordinates for the generation of similarity plots. Similarly, one could alter Def. 1 by, for example, removing the Euclidean distance factor from the coordinate assignment. Understandably, such changes would of course effect how one draws conclusions regarding the clustering and/or positioning of representations for various devices within a given similarity plot.

Figure 4A:
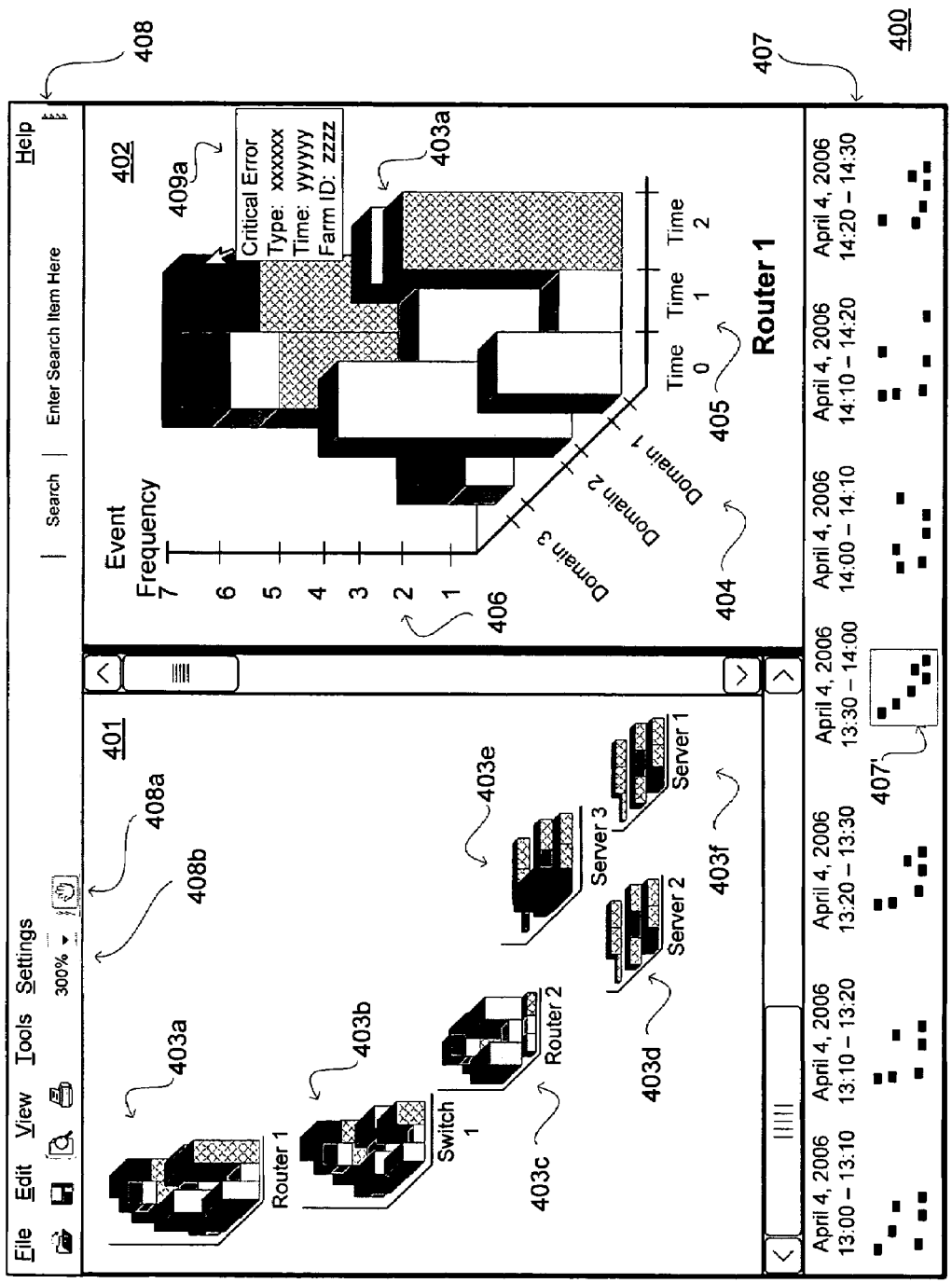
FIG. 4a through FIG. 4c are depictions of sample user interfaces for interacting with data visualization displays according to one preferred embodiment of the present invention.
Figure 4B:
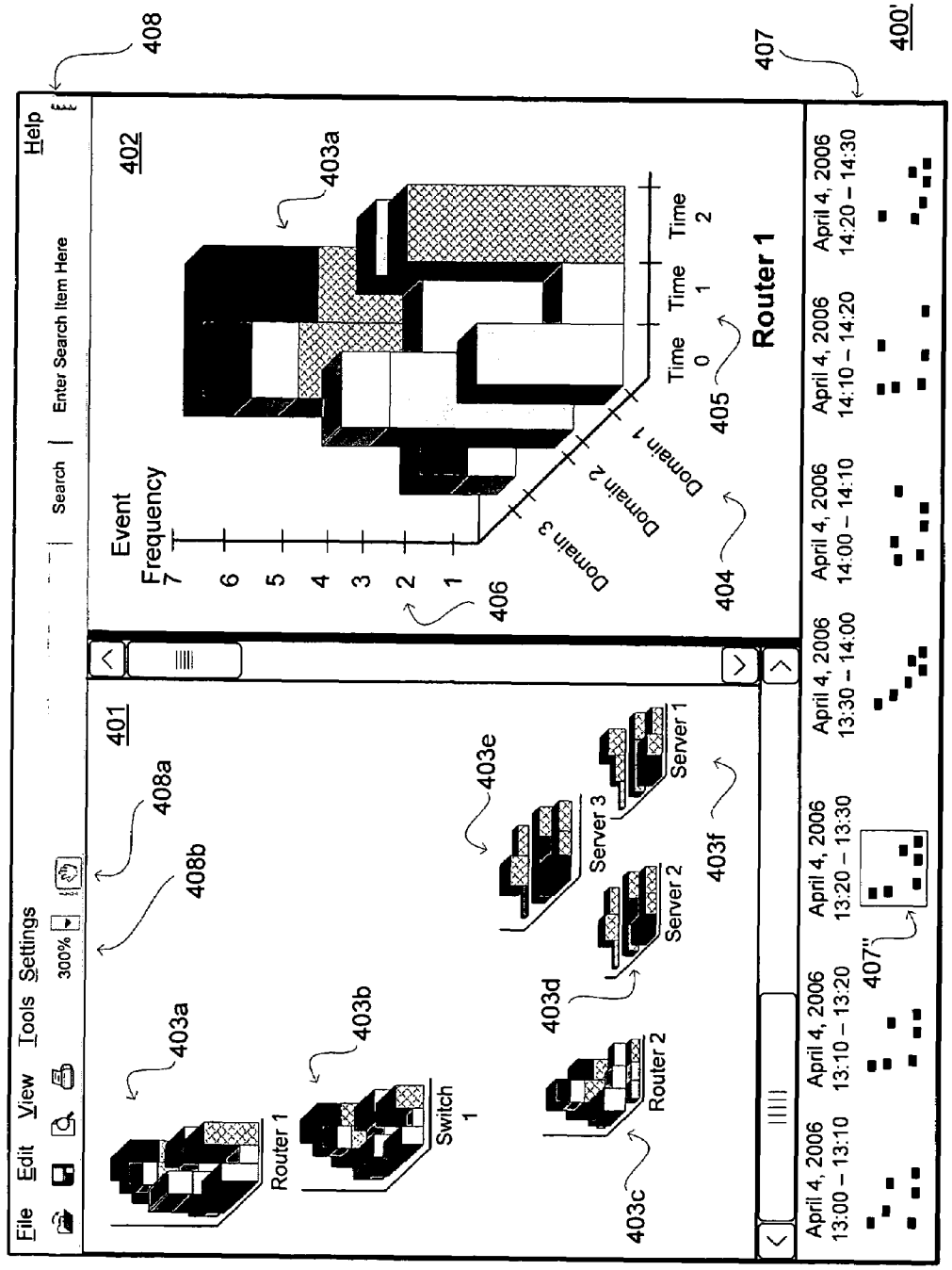
Figure 4C:
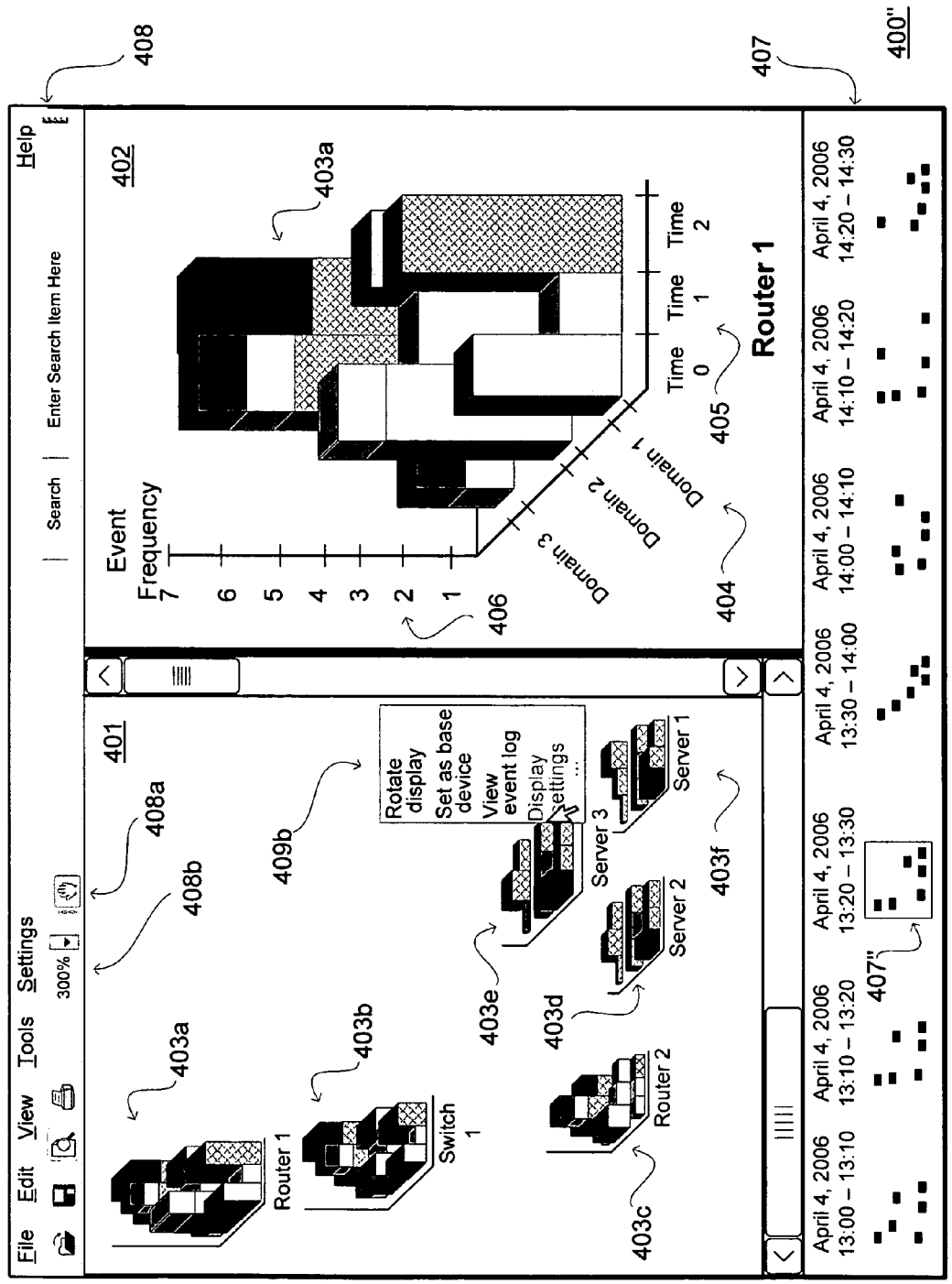

Referring now to FIG. 4a through FIG. 4c, those drawings depict various views 400, 400', and 400" of a sample user interface display for interacting with data visualization tool according to one preferred embodiment of the present invention. As depicted in FIG. 4a, the display in view 400 depicts in a first window 401 a similarity plot of various devices where the devices. In views 400, 400', and 400", the various devices are each represented by their individual respective unit cube diagrams 403a through 403f, with a blown-up version of a selected unit cube diagram (in this example, diagram 403a relating to device "Router 1") in FIG. 4a through FIG. 4c being depicted in second window 402. Alternatively, but less preferred, other representations of the devices could be used, such as colored icons and the like. However, as will be clear from the following, the unit cube diagrams are preferred as they provide the user with visual representations of the device's events and status.

Thus, as shown in window 401 of views 400, 400', and 400", in most preferred embodiments of the present invention the plotted Cartesian three-dimensional coordinates for each event vector will be represented on the similarity plots by a unit cube diagram particular to the device being plotted. The unit cube diagrams 403a through 403f each comprise a three-dimensional bar graph that represent all of the events and domains that have been taken into account when calculating the event vector for the plotting of that device.

In this manner, the unit cube diagrams in window 401 represent graphically everything that was happening to each device at the point in time (or slice of time), while the larger similarity plot display in turn shows the relationship of that device to all other devices. This relationship between the unit cube diagrams and the overall vector similarity plot allows the present invention to provide easily digestible summary regarding potential relationships of devices (and their statuses) without losing the detail that was used to create the digestible summary. Thus, a user could identify devices or groupings of devices that are of interest and then easily zoom in or out to explore the relationships (e.g., using menu options or tools in menu bar 408, such as tilt and rotate tool 408a or zoom tool 408b), and drill down supporting information for each device. One could zoom far out to see how various devices line up in the similarity plot and then, when an item of interest is identified, zoom in all the way on a particular device (or click on that particular device to display its in blow-up form in window 402) to see detailed information provided by the associated unit cube diagram regarding its various domains that have contributed to its plotting. A particular device then, for example, can be identified as having a significant number of issues and/or events occurring with respect to a certain domain.

As depicted in FIG. 4a, preferred unit cube diagrams provide barigraphical representations of each domain in the event vector (or each entity for each device), which in turn form each dimension of the similarity equation. The unit cube diagram shows both event information in terms of its domain on a first axis 404 (preferably depth), event frequency on a second axis 406 (preferably height), and time period on a third axis 405 (preferably width). As depicted for unit cube diagram 603a, more than one time period can be shown, allowing a unit cube diagram to depict the current time period (i.e., the one being used for preparing the similarity plot) and one or more subsequent and/or prior time periods. It should be understood that axis for the domain variable will bear an appropriate label so the user will know that, for example, the first domain is for network events and the third domain is for environmental events. Additionally, it should be understood that the time period being used for preparing a similarity plot (e.g., a 30 minute interval) can be shown in the unit cube diagrams as being broken up into constituent groups (e.g., the three successive 10 minute intervals making up the 30 minute time period). Such alternative configurations could all be made available to a user, being selectable via various configuration settings.

Within each unit cube diagrams, the events for the device are depicted by various color coded and stacked cubes, with locations of the cubes in the diagram illustrating the time period and domain for the event, and the height of each cube corresponding to the (preferably weighted) frequency of each event. The color coding of the cubes can be used to illustrate event types (e.g., criticality) in conventional fashion. The color of each block would be would represent the criticality (e.g., red being critical, orange being high/caution, grey being reporting/informational, etc.). In each unit cube diagram every event relating to the device that occurred during a given time period (e.g., time 1) or several time periods (e.g., time 1, time 2, and time 3, as depicted) and for each domain of that device. During a given time period, if multiple events occur relating to the device in the same domain, then those events are stacked on top of each other (preferably with most critical events being put toward the top). A quick glance by the user would enable them to confirm, for example, that there are two times as many critical (e.g., red) events as there are reporting (e.g., grey) events.

As shown in FIG. 4*a*, a mouse-over operation of any particular unit cube diagram can optionally cause a pop-up window 409*a* to appear containing information regarding the particular event underlying a given stacked cube.

In preferred embodiments of the present invention as depicted in FIG. 4*a* through FIG. 4*c*, the user would be permitted to click on a particular device to select it (or a menu option to select a particular group of devices, domains or entities) and then enables the user to be linked to or investigate data concerning the selected devices/domains/entities, such as actual event log entries and the like. For example, a "mouse-over" operation or right-click operation on a displayed object of interest could cause the displaying of a sub-window 409*b* for various menu options concerning that device or, alternatively but not depicted, containing a table that depicts select information that the system knows about the object. Understandably, users may want to see similarities based on a particular device (instead of the one with the greatest magnitude) and thus may be provided with an option (such as via right-click menu option as depicted) to re-compute similarity vectors and generate a similarity plot based upon the particular device of interest.

Embodiments of the present invention are intended to provide dynamic refresh and calculation abilities if the user so desires. For example, if the user were to set their time horizon of interest to be 20 minutes, then the unit diagrams and the similarity plot(s) being displayed would be automatically updated to show the most recent 20 minutes worth of event data and information and to break down past event data into other 20 minute intervals. These different similarity plots and unit diagrams from different time periods could then be used to compare event information from various times and thus provide an ability to explore the various symptoms experienced by the computing network over time. As shown in FIG. 4*a* through FIG. 4*c*, thumbnail depictions of similarity plots for such time periods can be displayed in views 400, 400', and 400", in a third window 407, allowing the user to select a particular time period to display in window 401 by a clicking operation on the thumbnail. For example, view 400 in FIG. 4*a* shows selection of the thumbnail 407' for the 13:30 to 14:00 time period (which thumbnail corresponds to the display in window 401), while views 400' and 400" show the selection of the thumbnail 407", for the prior 13:20 to 13:30 time frame. Comparison of window 401 in view 400 with window 401 in views 400' and 400" will show that unit cube diagrams 403*a*-403*f* reflect different event data for the time period and are located in different positions for the similarity plot.

Various different displays can be formed using known computer program design concepts, such as multi-window and multi-panel displays, tabs and the like, to provide a service engineer or other user with the ability to view (and navigate or interact with) the similarity plots and unit cube diagrams as described generally herein. For example, the split display as shown in FIG. 4*a* through FIG. 4*c* can be used where one half of a window could depict an actual domain display while the other half could comprise related unit cube diagrams. Alternatively, a window of such a split display could show event logs for selected devices.

Alternatively, two side by side panels could be provided such that a used could be provided with simultaneous displays of event information over different time slices.

Preferably, the user interface of the data visualization tool allows a service engineer user to select and view details regarding various primary computing system farms or resources, or particular subsystems or devices within a farm or resource, for examination. As such, the user interface can identify and explore trouble areas and display events that have various levels of criticality. Such selection can be done in various manners, such as using menu options or selecting devices and/or sub-systems from a network system map of a network and system monitoring tool.

As will be readily appreciated by one skilled in the art, it is possible to alter weights in the equations above for various purposes. The ability to weight entities gives the ability to make certain entities of more interest than others. For example, weights can be modified on the fly to give different views of the events in the monitored network system which views emphasize different entities, filter out certain entities when deciding where to place objects, emphasize different types of faults. In particular, raw event information and data can be stored as it is received, and then different sets of weightings can be alternatively applied to the stored event data.

For example, a remote services engineer might want to change the weighting because he knows that one event type is more critical to certain entity areas than other entity areas. Thus, if a remote services engineer determines that the initial similarity plot displayed according to the present invention depicts clusters of event vectors that potentially indicate a systematic problem relating to a particular type of device, the engineer could cause the similarity plot to be recalculated and redrawn to depict representations of event vectors' plotted in Cartesian space for only those devices of that type and then to recalculate the vectors using a one or more other sets of weights particularly adapted for devices of that type. In this manner, the same model event vector model can be applied to get a different resulting display. Furthermore, a suspected processing error in one particular device could cause the service engineer to apply a sort and then only show things that might be affected by the sort, and this would give the engineer a new display so he can see if he is heading in the right direction with his diagnosing efforts.

Additionally, it will be appreciated by one skilled in the art that displays will not at all times need to have the similarity plot generated relative to the device in the entire network system having the highest overall magnitude for its event vector. In certain circumstances, for example, a services engineer might want to be provided with a display that calculates and plots only those event vectors for devices associated with a particular location (such as a server farm location) or for a certain device type, thus organizing the display relative to highest magnitude vector from that location or for that device type. Additionally, a user could alternatively select a particular device and re-perform the similarity calculations relative to that device (as opposed to the highest magnitude vector).

As will be readily appreciated by one skilled in the art, by applying the three dimensional graphing capability of programming languages such as Java and Microsoft .NET, three dimensional navigation capabilities as described herein (zoom in, zoom out, rotations) can created to aide in the visualization process. For example, the zoom in capability could allow a user to view the active events for a device, the zoom out capability could allow the user to identify any larger patterns identified by the measurement of similarity, and the rotation capability could allow the user to visually inspect the representations of the plotted event vectors for each device from different angles further improving the ability to identify other patterns in the event data.

Additionally, nested data grouping makes it possible to show the similarity between event vectors having common elements. For example, devices and their respective event vectors can be grouped by device location, city, country, or region for purposes of investigating new or revised similarity plots. Applying the measure of similarity for various event vectors at each of these levels can provide additional insight into how devices within a particular geographic region are related. This same approach can be applied to grouping devices by the service or client that it supports. In this case, the technique can reveal how individual devices are impacting service delivery or client access.

While the visual correlation capabilities described above greatly assist in identifying patterns, it will be further understood by one skilled in the art that the application of both statistical and calculus based techniques may provide mathematical bases as further avenues for partially automating the identifying of patterns that correspond to the root cause of events. This could allow the root cause analysis to be performed in an automated or partially automated fashion. Understandably, the event vectors can optionally be used as inputs into a correlation engine as an adjunct to the visual diagnostic methods utilized according to embodiments of the present invention.

Understandably, a three dimensional volume or surface can be defined by several points in space. After plotting several event vectors in three-dimensional Cartesian space as described above, these plotted points can then be characterized as one or more surfaces to which calculus space techniques can be applied to, for example, determine gradients for rate of change, slope, points of inflexion, and the like. Such mathematical techniques could be used to determine whether, for example, remedial actions have had desirable or undesirable effects on targeted event types (e.g., a point of inflexion in time-phased data could mean the underlying systematic problem went from bad to worse). Or, for example, if things changed at a greater rate one could determine you know you could actually go well if things are changing really fast in a particular direction either in frequency or in similarity either positive or negative would indicate a potential area of interest for further examination.

As will be readily appreciated by one skilled in the art, the approach for event data visualization employed in accord with these preferred embodiments of the present invention solves drawbacks inherent in the prior art at various levels. The unit cube diagrams for each device are encoded so that frequency, severity, and impact domain is readily visible. This makes it visually possible to see the relationship between events for a given device. Furthermore, the data is visualized in a three dimensional space by applying information retrieval techniques, thereby enabling a user to identify similarity between objects without knowing the underlying relationships.

Applications of the concepts of the present invention provide an interactive method and tools for analyzing the relationship between devices/systems, which gives operational teams, including service engineers and/or network managers, a clear understanding of active events. This results in a reduced MTTR, which, operationally, translates into two key benefits—avoidance of costly technology downtime for business owners and/or reduced staffing requirements for technology operations.

While the above detailed description has focused on the implementation of the present invention utilizing software, one of ordinary skill in the art will readily appreciate that the process steps and decisions may be alternatively performed by functionally equivalent circuits such as a digital signal processor circuit or an application specific integrated circuit (ASIC). Any process flows described above are not intended to describe the exact syntax of any particular programming language, and the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system (e.g., within random access memory or RAM). It is also to be understood that other embodiments of the invention can provide the applications operating within the processor as the processes. While not shown in this example, those skilled in the art will understand that the computer system may include other processes and/or software and hardware subsystems, such as an operating system, which have been left out of this illustration for ease of description of the invention.

Furthermore, the data visualization processes described herein are specifically applied area of network and computer system management. It will be readily appreciated that the concepts described herein it can be equally applied to any situation that requires large amounts of data to be analyzed for causal relationships. Analysis of census data, scientific or experimental data, and financial data are examples of such other applications.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD- ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for processing and displaying a plurality of fault events occurring in a computing system, said method comprising:

defining devices in said computing system and entities of said devices;

defining event types for said devices;

receiving event data reporting the occurrence of events in said computing system, said reported events being of said event types;

preparing an event vector for each of a selected plurality of said devices, each said event vector having a number of dimensions corresponding to entities defined for a particular device corresponding to said event vector;

calculating a vector magnitude for each said event vector and identifying one of said event vectors as having the greatest vector magnitude;

calculating similarity scores for each of said event vectors other than said event vector identified as having the greatest vector magnitude, said similarity scores being calculated relative to said event vector identified as having the greatest vector magnitude;

calculating distances for each of said event vectors other than said event vector identified as having the greatest vector magnitude, said distances being calculated relative to said event vector identified as having the greatest vector magnitude;

assigning plotting coordinates to each of said event vectors using each said event vector's distance and similarity score; and generating and displaying a similarity plot using said coordinates, wherein said similarity plot visually depicts relationships between said selected plurality of devices.

2. The method of claim 1, wherein said defining of devices and entities comprises establishing entity weightings for each defined entity of each said device, and said entity weightings reflecting relative criticalities of said entities.

3. The method of claim 2, wherein said defining of event types comprises establishing event type weightings for each type of event for said devices and entities, and said event type weightings reflecting relative severities of events within said event types.

4. The method of claim 2, wherein said preparing of said event vectors comprises calculating a frequency factor from said reported events for each entity of each device of said selected plurality of devices, and applying an appropriate one of said entity weightings to each said frequency factor.

5. The method of claim 4, wherein said frequency factor is calculated using established event type weightings, said event type weightings reflecting relative severities of events within said event types.

6. The method of claim 5, wherein each said frequency factor comprises a weighted sum of events for a given entity of a given device.

7. The method of claim 4, further comprising:

reviewing said displayed similarity plot;

identifying one or more devices from said selected plurality of said devices as being of interest from said similarity plot;

assigning revised plotting coordinates to said one or more devices of interest, wherein said revised plotting coordinates as assigned by utilizing one of revised frequency factors, revised entity weightings, or both; and generating a revised similarity plot for said one or more devices of interest using said revised plotting coordinates.

8. The method of claim 1, wherein said assigning of plotting coordinates comprises giving said event vector identified as having the greatest vector magnitude a linear Cartesian coordinate assignment of $(0, 0, \|\hat{V}_{max}\|)$, where $\|\hat{V}_{max}\|$ is a magnitude value calculated for said event vector identified as having the greatest vector magnitude.

9. The method of claim 1, wherein said each of said event vectors other than said event vector identified as having the greatest vector magnitude is assigned plotting coordinates in a linear Cartesian coordinate system according to $$(d_{\hat{V}_k} \sin\theta_{\hat{V}_k}, d_{\hat{V}_k} \cos\theta_{\hat{V}_k}, \|\hat{V}_k\|)$$

where $\hat{V}_k$ denotes each of said event vectors other than said event vector identified as having the greatest vector magnitude, $\|\hat{V}_k\|$ is a magnitude value calculated for each of said event vectors other than said event vector identified as having the greatest vector magnitude, $\theta_{\hat{V}_k}$ is a similarity angle calculated from the similarity score for event vector $\hat{V}_k$, and $d_{\hat{V}_k}$ is the distance between vector $\hat{V}_k$ and said event vector identified as having the greatest vector magnitude.

10. The method of claim 1, wherein said similarity plot comprises a three-dimensional plot depicting relative magnitudes of said event vectors in a first dimension and relative similarities of said event vectors in a second and third dimension.

11. The method of claim 10, wherein said similarity plot is displayed to a user via an electronic display, and wherein said display is adapted to allow said user to interact with said display to obtain underlying event information for each of said plurality of selected devices.

12. The method of claim 1, wherein said similarity plot comprises representations of each of said plurality of selected devices wherein said representations are plotted in three-dimensions according to said plotting coordinates.

13. The method of claim 12, wherein each said representation comprises a unit cube diagram for a corresponding one of said plurality of selected devices, said unit cube diagram depicting in graphical format a frequency measure and a severity of each of said reported events falling within each particular entity of said corresponding one of said plurality of selected devices.

14. The method of claim 13, wherein each said unit cube diagram comprises a barigraphical representation of each of said reported events falling within each particular entity of said corresponding one of said plurality of selected devices occurring within one or more selected time periods.

15. The method of claim 14, wherein said similarity plot is displayed to a user via an electronic display, and wherein said display is adapted to allow said user to interact with said display.

16. The method of claim 15, wherein said similarity plot is a three-dimensional plot, and said electronic display is adapted to permit said user to rotate the perspective of said three-dimensional plot.

17. The method of claim 14, wherein said similarity plot is a three-dimensional plot, and said electronic display is adapted to permit said user to zoom into and out of said three-dimensional plot.

18. The method of claim 1, further comprising:
reviewing said displayed similarity plot;
identifying a subset of said selected plurality of said devices as being of interest from said similarity plot;
assigning revised plotting coordinates to each device of said subset of said selected plurality of said devices; and
generating a revised similarity plot for said subset using said revised plotting coordinates.

19. The method of claim 1, wherein said event vectors are prepared using event data for a selected time period.

20. The method of claim 19, further comprising:
establishing two or more time periods each spanning a known amount of time, said displayed similarity plot corresponding to a first one of said time periods;
reviewing said displayed similarity plot corresponding to said first one of said time periods;
repeating said calculating of vector magnitudes, similarity scores and distances for revised event vectors corresponding to a second one of said time periods and assigning revised plotting coordinates to said revised event vectors;
generating and displaying a revised similarity plot corresponding to said second one of said time periods using said revised plotting coordinates; and
monitoring said selected plurality of devices over time by comparing said displayed similarity plot and said displayed revised similarity plot.

21. A computer readable medium having computer readable code thereon for processing and displaying information concerning a plurality of fault events occurring in a computing system, the medium comprising:
definitions of devices in said computing system and entities of said devices;
definitions of event types for said devices;
instructions for receiving event data reporting the occurrence of events in said computing system, said reported events being of said event types;
instructions for preparing an event vector for each of a selected plurality of said devices, each said event vector having a number of dimensions corresponding to entities defined for a particular device corresponding to said event vector;
instructions for calculating a vector magnitude for each said event vector and identifying one of said event vectors as having the greatest vector magnitude;
instructions for calculating similarity scores for each of said event vectors other than said event vector identified as having the greatest vector magnitude, said similarity scores being calculated relative to said event vector identified as having the greatest vector magnitude;
instructions for calculating distances for each of said event vectors other than said event vector identified as having the greatest vector magnitude, said distances being calculated relative to said event vector identified as having the greatest vector magnitude;
instructions for assigning plotting coordinates to each of said event vectors using each said event vector's distance and similarity score; and
instructions for generating and displaying a similarity plot using said coordinates, wherein said similarity plot visually depicts relationships between said selected plurality of devices.

22. The computer readable medium of claim 21, wherein said definitions of devices and entities comprises entity weightings for each defined entity of each said device, and said entity weightings reflecting relative criticalities of said entities.

23. The computer readable medium of claim 22, wherein said definitions of event types comprises event type weightings for each type of event for said devices and entities, and said event type weightings reflecting relative severities of events within said event types.

24. The computer readable medium of claim 22, wherein said instructions for preparing of said event vectors comprises instructions for calculating a frequency factor from said reported events for each entity of each device of said selected plurality of devices, and applying an appropriate one of said entity weightings to each said frequency factor.

25. The computer readable medium of claim 24, wherein said frequency factor is calculated using established event type weightings, said event type weightings reflecting relative severities of events within said event types.

26. The computer readable medium of claim 25, wherein each said frequency factor comprises a weighted sum of events for a given entity of a given device.

27. The computer readable medium of claim 24, further comprising:
reviewing said displayed similarity plot;
instructions for enabling a user to identify one or more devices from said selected plurality of said devices as being of interest by interacting with said displayed similarity plot;
instructions for assigning revised plotting coordinates to said one or more devices of interest, wherein said revised plotting coordinates as assigned by utilizing one of revised frequency factors, revised entity weightings, or both; and
instructions for generating and displaying a revised similarity plot for said one or more devices of interest using said revised plotting coordinates.

28. The computer readable medium of claim 21, wherein said displaying of said similarity plot comprises a providing a three-dimensional plot to a user via an electronic display, and wherein said computer readable medium further comprises instructions for enabling said user to interact with said display to obtain underlying event information for each of said plurality of selected devices.

29. A computing system adapted process and display information concerning a plurality of fault events occurring in a computing system, the computing system comprising:
a memory;
a processor;
a persistent data store;
a communications interface; and
an electronic interconnection mechanism coupling the memory, the processor, the persistent data store, and the communications interface;
wherein said persistent data store contains a database storing definitions of devices in said computing system, definitions of entities of said defined devices, and definitions of event types for said devices;

and wherein the memory is encoded with a data visualization application that when performed on the processor, provides a data visualization process for processing event information, the process causing the computing system to perform the operations of:

receiving event data reporting the occurrence of events in said computing system, said reported events being of said event types;

preparing an event vector for each of a selected plurality of said devices, each said event vector having a number of dimensions corresponding to entities defined for a particular device corresponding to said event vector;

calculating a vector magnitude for each said event vector and identifying one of said event vectors as having the greatest vector magnitude;

calculating similarity scores for each of said event vectors other than said event vector identified as having the greatest vector magnitude, said similarity scores being calculated relative to said event vector identified as having the greatest vector magnitude;

calculating distances for each of said event vectors other than said event vector identified as having the greatest vector magnitude, said distances being calculated relative to said event vector identified as having the greatest vector magnitude;

assigning plotting coordinates to each of said event vectors using each said event vector's distance and similarity score;

generating and displaying a similarity plot using said coordinates, wherein said similarity plot visually depicts relationships between said selected plurality of devices.

* * * * *

UNITED STATES PATENT AND TRADEMARK OFFICE
CERTIFICATE OF CORRECTION

PATENT NO.        : 7,523,349 B2
APPLICATION NO.   : 11/509693
DATED             : April 21, 2009
INVENTOR(S)       : Doyle Barras Page 1 of 1

It is certified that error appears in the above-identified patent and that said Letters Patent is hereby corrected as shown below:

On the title page, item (57), line 8, "of a various" should read -- of various --.

In claim 28, column 28, line 48, "comprises a providing" should read -- comprises providing --.

Signed and Sealed this

Fourteenth Day of July, 2009

JOHN DOLL
*Acting Director of the United States Patent and Trademark Office*